US012753115B2

(12) United States Patent
Zhang et al.

(10) Patent No.: US 12,753,115 B2
(45) Date of Patent: Oct. 6, 2026

(54) LOW-COST FOUR-ELEMENT SYSTEM CEMENTITIOUS MATERIAL, PREPARATION METHOD AND APPLICATION THEREOF

(71) Applicant: University of Science and Technology Beijing, Beijing (CN)

(72) Inventors: Siqi Zhang, Beijing (CN); Tong Zhao, Beijing (CN); Huifen Yang, Beijing (CN); Wen Ni, Beijing (CN); Zeping Wu, Beijing (CN); Yue Li, Beijing (CN); Jia Li, Beijing (CN); Keqing Li, Beijing (CN); Pingfeng Fu, Beijing (CN); Yunyun Li, Beijing (CN); Xiang Chen, Beijing (CN); Yuhang Liu, Beijing (CN); Dongshang Guan, Beijing (CN); Jiajia Wang, Beijing (CN); Qiwei Sun, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 396 days.

(21) Appl. No.: 18/390,620

(22) Filed: Dec. 20, 2023

(65) Prior Publication Data

US 2024/0208861 A1 Jun. 27, 2024

(30) Foreign Application Priority Data

Dec. 24, 2022 (CN) ........................ 202211668516.4

(51) Int. Cl.

| | |
|---|---|
| ***C04B 7/153*** | (2006.01) |
| ***C04B 7/28*** | (2006.01) |
| ***C04B 11/26*** | (2006.01) |
| ***C04B 11/30*** | (2006.01) |
| ***C04B 28/02*** | (2006.01) |
| ***C04B 28/08*** | (2006.01) |
| ***C04B 28/14*** | (2006.01) |
| ***C04B 40/00*** | (2006.01) |
| ***C04B 111/10*** | (2006.01) |

(52) U.S. Cl.

CPC ................ *C04B 7/153* (2013.01); *C04B 7/28* (2013.01); *C04B 11/262* (2013.01); *C04B 11/30* (2013.01); *C04B 28/021* (2013.01); *C04B 28/082* (2013.01); *C04B 28/144* (2013.01); *C04B 40/0046* (2013.01); *C04B 2111/1037* (2013.01)

(58) Field of Classification Search

CPC ......... C04B 7/153; C04B 7/28; C04B 11/262; C04B 11/30; C04B 28/021; C04B 28/082; C04B 28/144; C04B 40/0046; C04B 2111/1037; C04B 28/08; C04B 7/243; C04B 7/21; Y02P 40/10

See application file for complete search history.

(56) References Cited

U.S. PATENT DOCUMENTS 9,834,479 B2 * 12/2017 Gong .................... C04B 12/005

FOREIGN PATENT DOCUMENTS

| | | | | |
|---|---|---|---|---|
| CN | 104496388 A | * | 4/2015 | ............. C04B 28/14 |
| KR | 101840470 B1 | * | 5/2018 | ........... C04B 14/365 |
| KR | 102306318 B1 | * | 9/2021 | ............. C04B 18/06 |

* cited by examiner

*Primary Examiner* — Anthony J Green

(74) *Attorney, Agent, or Firm* — Pilloff Passino & Cosenza LLP; Rachel K. Pilloff; Sean A. Passino

(57) ABSTRACT

A low-cost four-element system cementitious material, a preparation method and an application thereof are provided by the present disclosure, and the cementitious material is used in the fields of mine cementing filling and building materials. The four-element system cementitious material includes the following raw materials in percentage by mass: 20-60% of water-quenched blast furnace slag, 10-40% of waste incineration bottom ash, 20% of pretreated waste incineration fly ash and the balance of desulfurization gypsum. The low-cost four-element system cementitious material is used to replace cement to prepare mine cementing filling materials, and is also used to prepare concrete materials for construction industry.

7 Claims, 5 Drawing Sheets

LOW-COST FOUR-ELEMENT SYSTEM CEMENTITIOUS MATERIAL, PREPARATION METHOD AND APPLICATION THEREOF

CROSS-REFERENCE TO RELATED APPLICATIONS

This application claims priority to Chinese Patent Application No. 202211668516.4, filed on Dec. 24, 2022, the contents of which are hereby incorporated by reference.

TECHNICAL FIELD

The present disclosure belongs to the field of mine cementing filling and building materials, and relates to a low-cost four-element system cementitious material, a preparation method and an application thereof.

BACKGROUND

It is expected that the global municipal solid waste production will increase to 2.2 billion tons by the year of 2025, and incineration power generation technology, which reduces the volume and weight of waste by 90% and 70% respectively, has become an important way of treating municipal solid waste. According to statistics, the total amount of municipal solid waste incinerated in China each year has exceeded 100 million tons, and there are two main particulate by-products in the incineration process, namely, the waste incineration bottom ash and the waste incineration fly ash, and the two products account for 25-30% and 3-5% of the total amount of incinerated waste, respectively. According to the Directory of National Hazardous Wastes of China, waste incineration fly ash (hereafter referred to as fly ash) is a hazardous waste. Unlike fly ash, the waste incineration bottom ash (hereinafter referred to as bottom ash) is a general solid waste collected from the bottom of the furnace, with a large yield of about 80-90% of the solid residue, and is usually physically sorted out from the large pieces of glass or ferrous materials therein, with a low chlorine salt content and pollutant concentration. By the end of the "Thirteenth Five-Year Plan", fly ash production is expected to reach more than 10 million tons/year, and now, in the context of the fast-paced incineration of municipal solid waste and the huge annual output of fly ash, the synergistic harmlessness and resourcefulness of fly ash and waste incineration bottom ash, as well as the safety hazards to the environment and human health, have become the hot topics for today's research in the field of solid waste and hazardous waste treatment.

Clinker in building materials usually refers to silicate cement clinker, that is, the international Portland cement clinker (cement clinker for short), which is made of raw materials containing CaO, $SiO_2$, $Al_2O_3$, $Fe_2O_3$ in appropriate proportions ground into fine powder and burned into a partially molten state, so as to obtain a hydraulic cementitious material with calcium silicate as the main mineral component. Besides, as a necessary step in the cement production, the process is also very complicated, which is roughly divided into five steps: crushing and pre-homogenization, raw material preparation, raw material homogenization, preheating decomposition and clinker firing. Among them, crushing and pre-homogenization includes: crushing and raw material pre-homogenization. The whole process is complex, costly, energy-consuming and has high carbon emissions, making green cementitious materials to replace cement clinker a new research direction.

Water washing (also known as neutral leaching) is a pretreatment method for fly ash, which effectively removes soluble salts like $Cl^-$ and some heavy metals in fly ash. At present, many studies on the synergistic preparation of green cementitious materials from water-washed fly ash with other solid wastes or cement provide theoretical support for the implementation of the engineering. However, these studies fail to synergistically dispose the fly ash and bottom ash and prepare low-cost clinker-free cementitious materials based on all solid wastes.

There are mainly three types of incineration technologies in China: grate furnace technology, fluidized bed technology and other incineration technologies. Waste incineration fly ash is fine particles carried by airflow and collected in air pollution control devices, which is mainly divided into grate furnace fly ash and circulating sulfurized bed fly ash according to different incineration technologies. The grate furnace process involves complete combustion in the incinerator by mechanical movement of the grate and produces less fly ash (accounting for 2.5% of the total waste), yet the contents of chloride (about 20%) and heavy metals are still high. As for the incinerator of fluidized bed, the waste is usually burned with the help of coal and quartz sand, and the production of fly ash is greater, accounting for 8-12% of the total waste, with a high content of silica-aluminum and a low content of soluble salts (about 5%).

SUMMARY

The technical problem to be solved by the present disclosure is that the existing technology of cementitious materials containing waste incineration fly ash has the following problems: excessive additives such as exciters and early-strengthening agents are required to be added in order to have the strength of practical value, or the complete replacement of cement has not been realized; in addition, the potential use of high silicate material bottom ash, which is also the output of the waste incineration process, for the preparation of cementitious materials in synergistic with solidified fly ash from industrial wastes has been overlooked.

In order to solve the above technical problems, the present disclosure provides the following technical scheme:

a low-cost four-element system cementitious material, including following raw materials in percentage by mass according to 100% by mass of the low-cost four-element system cementitious material: 20-60% of water-quenched blast furnace slag, 10-40% of waste incineration bottom ash, 20% of water-washed waste incineration fly ash and a balance of desulfurization gypsum.

Optionally, the water-quenched blast furnace slag refers to any water-quenched blast furnace slag with a 28 d activity not less than 95%.

Optionally, the waste incineration bottom ash refers to a bottom ash generated in a process of incineration and disposal of domestic wastes or industrial garbage, including main components of quartz, calcium carbonate and calcium akermanite, with a high content of active components, where an activity of water-quenched blast furnace slag is fully stimulated.

Optionally, the water-washed waste incineration fly ash refers to fly ash generated during an incineration and disposal of domestic waste or industrial waste, followed by pretreatment under different water-washing conditions, with unlimited source or type of waste.

Optionally, the desulfurization gypsum has a main composition similar with that of natural gypsum, being calcium sulfate dihydrate.

A chemical composition of the water-washed waste incineration fly ash, waste incineration bottom ash, water-quenched blast furnace slag, and desulfurization gypsum described herein refers to a content of various metals or mineral elements in terms of oxides, and does not refer to a content of compounds thereof present as oxides in the pretreated waste incineration fly ash, waste incineration bottom ash, water-quenched blast furnace slag, or desulfurization gypsum.

Optionally, according to a mass percentage, in the pretreated waste incineration fly ash, a content of CaO is ≥45%, a content of Cl is ≥20%, a content of $Na_2O$ is ≥10%, a content of $SiO_2$ is ≥3%, and a content of $Al_2O_3$ is ≥2%.

Optionally, according to a mass percentage, in the waste incineration bottom ash, a content of $SiO_2$ is ≥32%, a content of CaO is ≥30%, a content of $Al_2O_3$ is ≥7%, a content of $Fe_2O_3$ is ≥5%, and a content of $Na_2O$ is ≥2%.

Optionally, according to a mass percentage, in the water-quenched blast furnace slag, a content of CaO is ≥35%, a content of $SiO_2$ is ≥28%, a content of $Al_2O_3$ is ≥12%, and a content of MgO is ≥5%.

Optionally, according to a mass percentage, in the desulfurization gypsum, a content of CaO is ≥45%, and a content of $SO_3$ is ≥40%.

Optionally, a specific surface area of the water-quenched blast furnace slag is 450-500 square meter per kilogram ($m^2$/kg), a specific surface area of the pretreated waste incineration fly ash is ≥500 $m^2$/kg, a specific surface area of the waste incineration bottom ash is 400-450 $m^2$/kg, and a specific surface area of the desulfurization gypsum is 450-500 $m^2$/kg. The specific surface area of the raw material is increased by grinding, which stimulates the activity of water-quenched blast furnace slag and reduces the difficulty of hydration on the one hand, and improves the homogeneity of the materials on the other hand.

The present disclosure relates to a low-cost four-element system cementitious material, a preparation method and an application thereof. The low-cost four-element system cementitious material is capable of being used for replacing cement to prepare mine cementing filling materials, and is also capable of being used for preparing clinker-free concrete materials for the construction industry.

A preparation method of the low-cost four-element system cementitious material in preparing low-cost cement-free clinker, including following steps:

S1, carrying out water washing pretreatment on waste incineration fly ash to obtain a pretreated waste incineration fly ash;

S2, uniformly mixing the pretreated waste incineration fly ash with waste incineration bottom ash, water-quenched blast furnace slag and desulfurization gypsum according to a mass ratio to obtain a four-element system cementitious material; and S3, mixing water with the four-element system cementitious material of low-cost according to a mass ratio of (1-2):5 to prepare a cementitious material.

Compared with the prior art, the technical scheme provided by the present disclosure has following beneficial effects.

In the above technical scheme, comparing with the existing low-cost cementitious materials of pre-treatment of waste incineration fly ash and water-quenched blast furnace slag, the cementitious materials of the present disclosure synergistically utilizes the waste incineration bottom ash in a resourceful manner, with a simpler composition and requiring no addition of additives such as exciters and early-strengthening agents and without the need to mix cement clinker, it also includes the four compositions of water-quenched blast furnace slag, pretreated waste incineration fly ash, waste incineration bottom ash and desulphurization gypsum, with no risk of leaching out harmful substances such as heavy metals, and thus greatly reduces the cost of raw materials, coupled with a higher utilization rate of the waste incineration fly ash and bottom ash.

Under the coordinated preparation of low-cost four-element system cementitious materials using water-quenched blast furnace slag, desulfurization gypsum, pretreated waste incineration fly ash and bottom ash, the problems of the industrial solid wastes (water-quenched blast furnace slag, desulfurization gypsum), municipal hazardous wastes (waste incineration fly ash) and municipal solid wastes (waste incineration bottom ash) are addressed in terms of quantitative reduction, harmlessness and resourcefulness, so as to promote the coordinated resourceful use of solid wastes and hazardous wastes and environmental protection, and to provide a foundation for the large-scale substitution of cement curing and stabilizing fly ash in the concrete construction industry or the mining filling fields to produce low-cost cementless clinker-based four-element system cementitious materials for engineering applications.

For the above, the low-cost four-element system cementitious material provided by the present disclosure has a simple composition, high total economic benefits; it collaboratively utilizes the pretreated waste incineration fly ash and waste incineration bottom ash which are more difficult to be comprehensively utilized; it simplifies the raw material composition of the cementitious material of the pretreated waste incineration fly ash and waste incineration bottom ash, the water-quenched blast furnace slag and the desulfurization gypsum, and establishes the foundation for the collaborative technique of consolidation/stabilization of hazardous materials in multi-solid wastes and for the sustainable development of the waste incineration industry.

BRIEF DESCRIPTION OF THE DRAWINGS

In order to illustrate the technical schemes in the embodiments of the present disclosure more clearly, the drawings to be used in the description of the embodiments are briefly introduced hereinafter, and it is obvious that the drawings in the description hereinafter are only some of the embodiments of the present disclosure, and that for the person of ordinary skill in the field, other drawings are available on the basis of the drawings without creative labour.

DETAILED DESCRIPTION OF THE EMBODIMENTS

The technical schemes and technical problems solved in the embodiments of the present disclosure are described below in connection with the embodiments of the present disclosure. Obviously, the described embodiments are only a part of the embodiments of the present patented disclosure, and not all of them.

The fly ash used in embodiments of the present disclosure is collected from the grate furnace incineration process of a waste incineration power plant in China, where the waste is dried, incinerated and burned in different combustion sections of the grate sheet, and the fine particles of the combustion are collected in the heat reuse system (heat recovery boiler) and the flue gas purification system (dust collector), which contain much higher levels of heavy metals, dioxins and chlorine salts than the fly ash generated by other incineration technologies, after which the fly ash from the waste incineration is pretreated in the grate furnace process by means of different water washing conditions, so as to obtain the pretreated waste incineration fly ash that is used for the preparation of the four-element system cementitious material with the optimal properties (compressive strength).

The waste incineration bottom ash used in the embodiments of the present disclosure is collected from the incombustible mixture (slag) deposited at the bottom of the combustion boiler in the grate furnace technology of a garbage incineration power plant in China; it is a general solid waste collected from the bottom of the furnace, with a large yield of about 80-90% of the solid residue; it is obtained after physical sorting out of the large pieces of glass or ferrous materials therein, the chlorine salt content and pollutant concentration is low.

Figure 1:
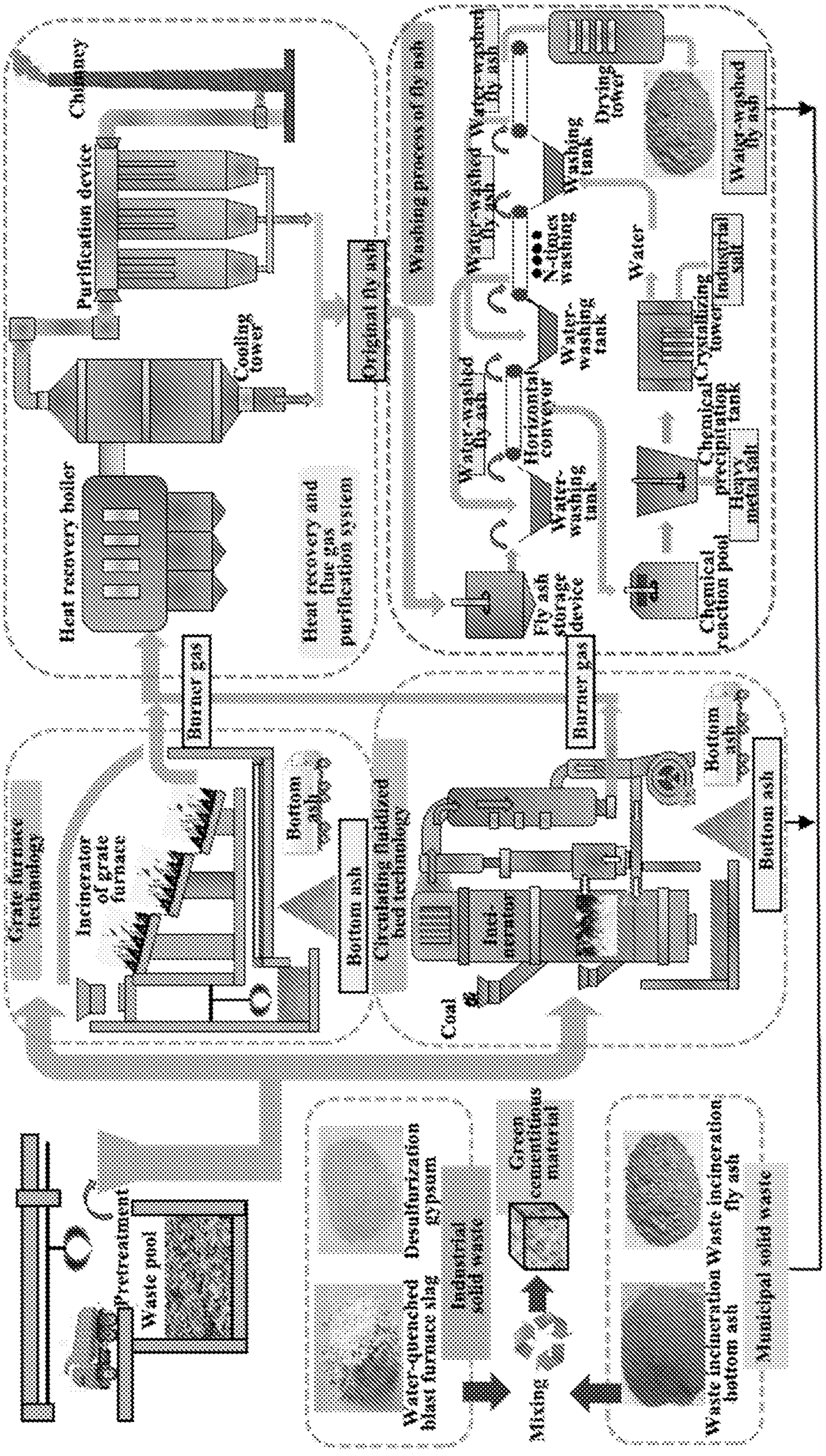
FIG. 1 shows a process of a preparation method and application of a low-cost four-element system cementitious material, and a process of applying the cementitious material provided in an embodiment of the present disclosure.

The cementitious material described in the present disclosure is usually mixed at a mass ratio of water to cementitious material of about (1-2):5 when used, and this water-to-cement ratio provides a low-cost cementitious material for cement-free clinker four-element system by large-scale substitution of cement curing and stabilization initially in combination with cementitious filling and mining technology or the preparation of concrete for the construction industry. A process for the specific implementation of the embodiments of the present disclosure is shown in FIG. 1.

Figure 2:
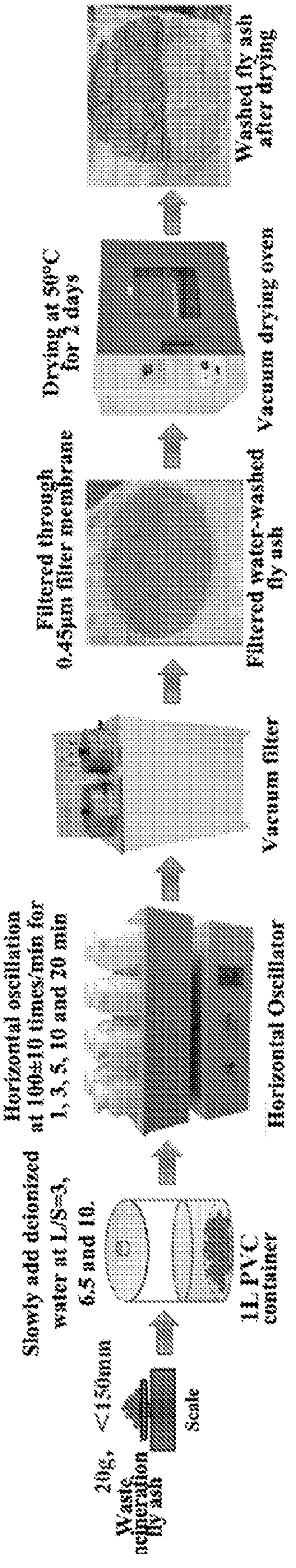
FIG. 2 shows a test process of washing pretreatment conditions of waste incineration fly ash according to the embodiment of the present disclosure.

Further, before preparing the cementitious material required by this embodiment, it is necessary to test the pretreatment conditions of waste incineration fly ash with water. The test method includes:

20 grams (g) of dried fly ash raw materials are put into a Polyvinyl chloride (PVC) container with a capacity of 1 liter (L), Liquid-solid ratio (L/S) and oscillation duration are set, then deionized water is slowly added according to the water-cement ratio/liquid-solid ratio of 3, followed by oscillation at room temperature at a frequency of 110±10 times/min in two time gradients for 1 and 5 minutes (min) respectively, as shown in Table 1; then, the container is taken off, and all the washing solutions are vacuum-filtered by a 0.45 micrometer (μm) filter membrane; the remaining washed fly ash residue and the filter membrane are put into an oven at a temperature of 50 degrees Celsius (° C.) for drying for 2 days, and then the filter residue is dried and homogenized to obtain washed fly ash; the specific water washing operation process is shown in FIG. 2.

Table 1 shows parallel specimens W1 and W7 of fly ash under different water washing test conditions.

TABLE 1

Parallel samples of fly ash under different washing test conditions

| Types of washed fly ash | W1 | W7 |
|---|---|---|
| L/S | 3 | 3 |
| Washing duration (min) | 1 | 5 |

Figure 3:
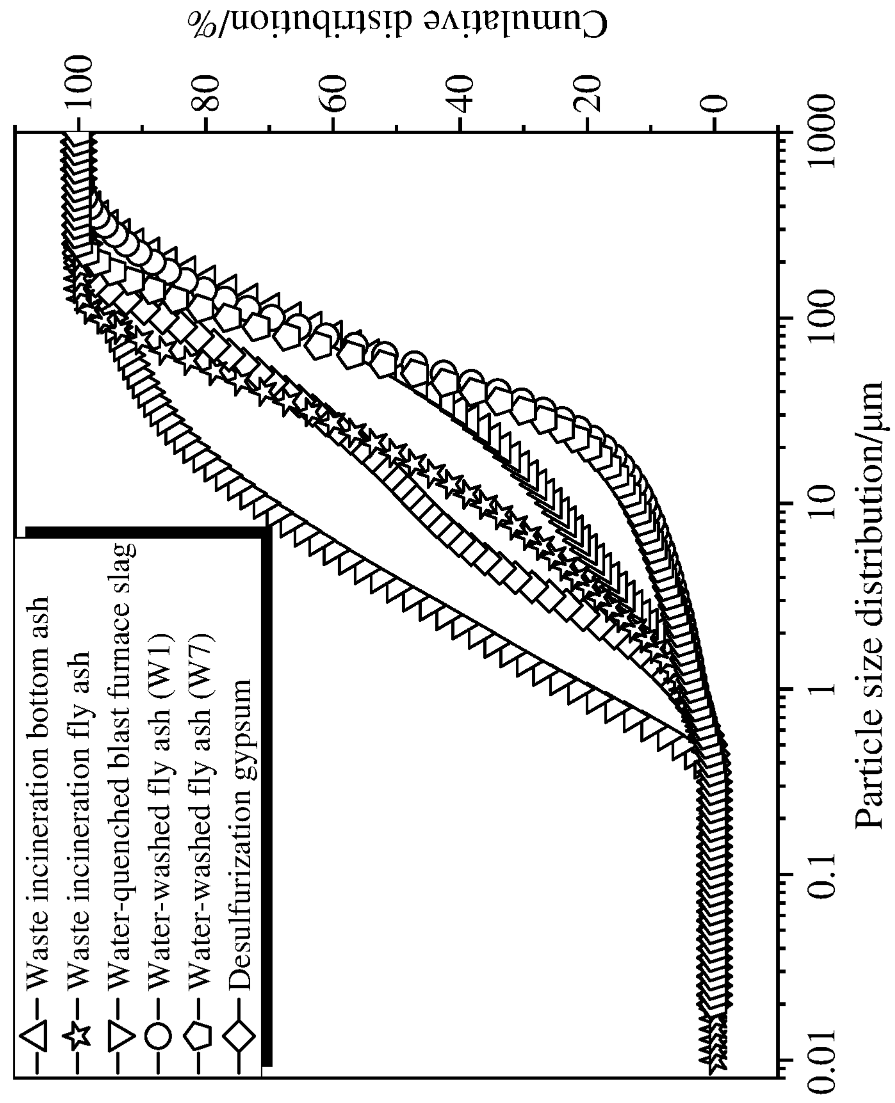
FIG. 3 depicts a cumulative particle size distribution of the cementitious materials in the embodiment of the present disclosure.
Figure 4:
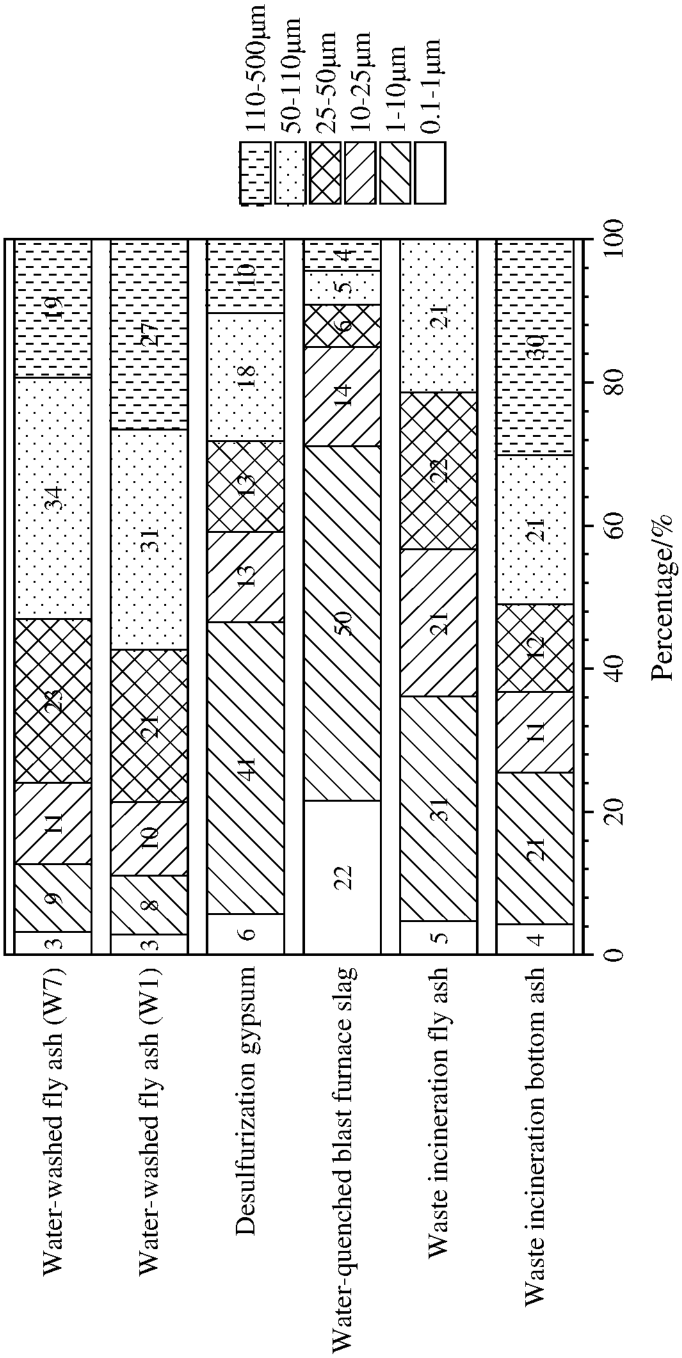
FIG. 4 illustrates a particle size distribution of the cementitious materials in the embodiment of the present disclosure.

Further, the share distribution of waste incineration fly ash and the particle size of desulfurization gypsum is shown in FIG. 3 and FIG. 4.

It can be seen from FIG. 3 and FIG. 4 that the shares of waste incineration fly ash in the particle size ranges of 0.1-1 μm, 1-10 μm, 10-25 μm, 25-50 μm, 50-110 μm, and 110-500 μm are 4.72%, 31.26%, 20.64%, 21.90%, 21.38% and 0%, respectively;

the shares of waste incineration bottom ash in the particle size ranges of 0.1-1 μm, 1-10 μm, 10-25 μm, 25-50 μm, 50-110 μm, and 110-500 μm are 4.25%, 21.21%, 11.29%, 12.22%, 20.89% and 30.14%, respectively;

the water-quenched blast furnace slag is collected from an iron and steel group in China, with shares in the particle size ranges of 0.1-1 μm, 1-10 μm, 10-25 μm, 25-50 μm, 50-110 μm, and 110-500 μm being 21.59%, 49.50%, 13.86%, 5.90%, 4.78% and 4.37%, respectively;

the desulfurization gypsum is collected from a coal-fired power plant in China, with shares in the particle size ranges of 0.1-1 μm, 1-10 μm, 10-25 μm, 25-50 μm, 50-110 μm, and 110-500 μm being 5.69%, 40.86%, 12.59%, 12.70%, 17.88% and 10.28%, respectively;

further, in the embodiments and comparative embodiments of the present disclosure, the waste incineration bottom ash is required to be ground to a specific surface area of 450 square meter per kilogram ($m^2/kg$), the water quenched blast furnace slag is required to be ground to a specific surface area of 500 $m^2/kg$, and the desulfurization gypsum is required to be ground to a specific surface area of 450 $m^2/kg$.

Figure 5:
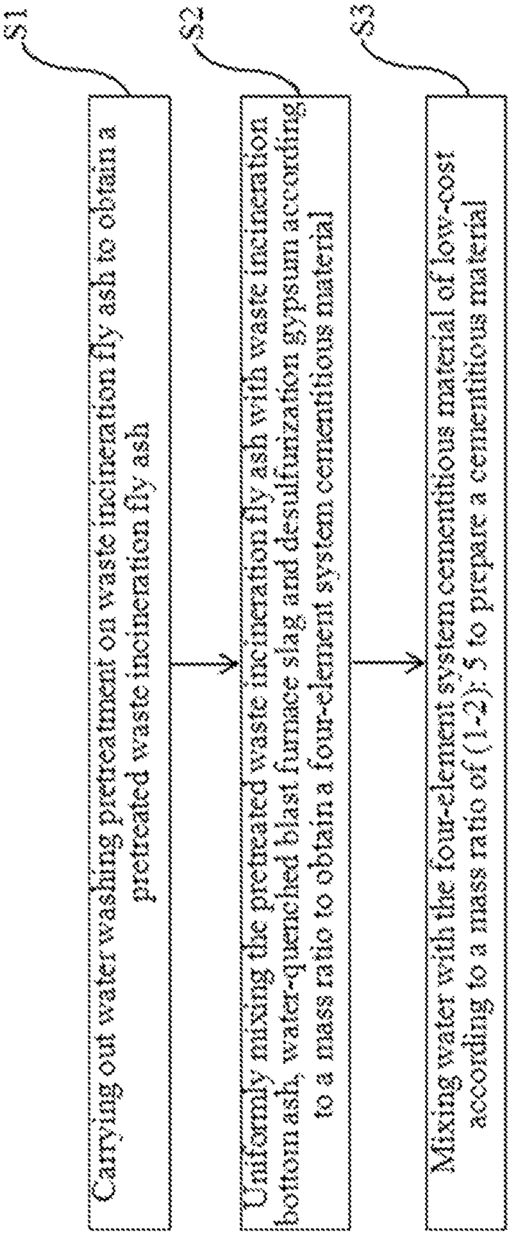
FIG. 5 is a process illustrating a preparation method of the low-cost four-element system cementitious material.

A preparation method of a low-cost four-element system cementitious material, including the following steps as shown in FIG. 5:

S1, carrying out water washing pretreatment on waste incineration fly ash to obtain a pretreated waste incineration fly ash;

S2, uniformly mixing the pretreated waste incineration fly ash with waste incineration bottom ash, water-quenched blast furnace slag and desulfurization gypsum according to a mass ratio to obtain a four-element system cementitious material; and S3, mixing water with the four-element system cementitious material of low-cost according to a mass ratio of (1-2):5 to prepare a cementitious material.

Embodiment 1

A low-cost four-element system cementitious material, including the following components in percentage by mass:

20% of pretreated waste incineration fly ash, 16% of waste incineration bottom ash, 48% of water-quenched blast furnace slag, and 14% of desulfurization gypsum.

In this embodiment, water-washed pretreated fly ash (W1) with a chloride Cl content of about 6 is selected. Among them, the shares of water-washed fly ash (W1) in the particle size ranges of 0.1-1, 1-10, 10-25, 25-50, 50-110, and 110-500 μm are 2.89%, 8.16%, 10.33%, 21.23%, 30.85%, and 26.55%, respectively; the shares of water-quenched blast furnace slag in the particle size ranges of 0.1-1, 1-10, 10-25, 25-50, 50-110, and 110-500 μm are 21.59%, 49.50%, 13.86%, 5.90%, 4.78%, and 4.37%, respectively; the shares of desulfurization gypsum in the particle size ranges of 0.1-1, 1-10, 10-25, 25-50, 50-110, and 110-500 μm are 5.69%, 40.86%, 12.59%, 12.70%, 17.88%, and 10.28%, respectively. The pretreated waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Embodiment 2

A low-cost four-element system cementitious material, including the following components in percentage by mass:

20% of pretreated waste incineration fly ash, 22% of waste incineration bottom ash, 44% of water-quenched blast furnace slag, and 14% of desulfurization gypsum.

In this embodiment, water-washed pretreated fly ash (W1) with a chlorine Cl content of about 6 is selected. Therein, the shares of particle size of the water-washed fly ash (W1), water-quenched blast furnace slag and desulfurization gypsum are the same as those in Embodiment 1. The water-washed waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Embodiment 3

A low-cost four-element system cementitious material, including the following components in percentage by mass:

20% of pretreated waste incineration fly ash, 30% of waste incineration bottom ash, 30% of water-quenched blast furnace slag, and 20% of desulfurization gypsum.

In this embodiment, water-washed pretreated fly ash (W1) with a chlorine Cl content of about 6 is selected. Therein, the shares of particle size of the water-washed fly ash (W1), water-quenched blast furnace slag and desulfurization gypsum are the same as those in Embodiment 1. The water-washed waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Embodiment 4

A low-cost four-element system cementitious material, including the following components in percentage by mass:

20% of pretreated waste incineration fly ash, 15% of waste incineration bottom ash, 45% of water-quenched blast furnace slag, and 20% of desulfurization gypsum.

In this embodiment, water-washed pretreated fly ash (W7) with a chlorine Cl content of about 1 is selected. Among them, the shares of water-washed fly ash (W7) in the particle size ranges of 0.1-1, 1-10, 10-25, 25-50, 50-110, and 110-500 μm are 3.21%, 9.48%, 11.33%, 22.97%, 33.72%, and 19.29%, respectively; the shares of particle size of the water-quenched blast furnace slag and desulfurization gypsum are the same as those in Embodiment 1. The water-washed waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Embodiment 5

A low-cost four-element system cementitious material, including the following components in percentage by mass:

20% of pretreated waste incineration fly ash, 22% of waste incineration bottom ash, 44% of water-quenched blast furnace slag, and 14% of desulfurization gypsum.

In this embodiment, water-washed pretreated fly ash (W7) with a chlorine Cl content of about 1 is selected. Among them, the shares of water-washed fly ash (W7) in the particle size ranges of 0.1-1, 1-10, 10-25, 25-50, 50-110, and 110-500 μm are 3.21%, 9.48%, 11.33%, 22.97%, 33.72%, and 19.29%, respectively; the shares of particle size of the water-quenched blast furnace slag and desulfurization gypsum are the same as those in Embodiment 1. The water-washed waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Embodiment 6

A low-cost four-element system cementitious material, including the following components in percentage by mass:

20% of pretreated waste incineration fly ash, 34% of waste incineration bottom ash, 34% of water-quenched blast furnace slag, and 12% of desulfurization gypsum.

In this embodiment, water-washed pretreated fly ash (W7) with a chlorine Cl content of about 1 is selected. Among them, the shares of water-washed fly ash (W7) in the particle size ranges of 0.1-1, 1-10, 10-25, 25-50, 50-110, and 110-500 μm are 3.21%, 9.48%, 11.33%, 22.97%, 33.72%, and 19.29%, respectively; the shares of particle size of the water-quenched blast furnace slag and desulfurization gypsum are the same as those in Embodiment 1. The water-washed waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Before preparing the cementitious materials required by the comparative embodiments, there is no need to pretreat the waste incineration fly ash.

Comparative Embodiment 1

A low-cost four-element system cementitious material, including the following components in percentage by mass:

20% of pretreated waste incineration fly ash, 17% of waste incineration bottom ash, 51% of water-quenched blast furnace slag, and 12% of desulfurization gypsum.

In this comparative embodiment, waste incineration fly ash with a chlorine Cl content of about 20 is selected. The shares of particle sizes of the waste incineration fly ash, waste incineration bottom ash and desulfurization gypsum are the same as those in Embodiment 1. The waste incineration fly ash, waste incineration bottom ash, water-quenched blast furnace slag and desulfurization gypsum are respectively weighed according to the stated percentages, and specimens of filling material are prepared according to GB17671-1999 *Method for testing cements—Determination of strength.*

Comparative Embodiment 2

A cementitious material containing cement clinker, including the following components in percentage by mass:

20% of pretreated waste incineration fly ash, 70% of cement and 10% of desulfurization gypsum.

In this comparative embodiment, water-washed pretreated fly ash (W1) with a chlorine Cl content of about 6 is selected. The shares of particle sizes of the waste incineration fly ash, cement and desulfurization gypsum are the same as those in Comparative embodiment 1. Waste incineration fly ash, cement and desulfurization gypsum are weighed according to the specified percentages, and the specimens of filling material are prepared according to GB17671-1999 *Method for testing cements—Determination of strength.*

The cementitious materials of Embodiments 1 to 6 and Comparative embodiments 1 to 2 are mixed with water at a mass ratio of (1-2):5, respectively, and the specimens of the filling material are prepared according to GB17671-1999 Method for testing cements-Determination of strength, the specimens are sized as 30 mm×30 mm×50 mm, and are maintained at a temperature of about 20-35° C. and a humidity of 99.5% or more.

In the following, the compressive strength of moulded specimens at different curing ages is tested according to the GB17671-1999 *Method for testing cements—Determination of strength* (MTCDS), and the leaching test is carried out according to the national standard (HJ/T 557-2010) Solid waste-Extraction procedure for leaching toxicity-Horizontal vibration method, the leaching concentrations of heavy metals and $Cl^-$ and $SO_4^{2-}$ anions contained in fly ash, pretreated fly ash (W1 and W7) feedstocks, and moulded specimens are determined using inductively coupled plasma-atomic emission spectrometry (ICP-MS) and ion chromatography (IC), respectively; the total cost-benefit analysis is also performed.

The specific cost-benefit calculation process is shown in Table 2.

TABLE 2

Examples of cost-benefit analysis of low-cost four-element system cementitious materials

| Material production cost | Unit price (CNY) | Price per t of cementitious material produced (CNY) Ce 1 | Ce 2 | E 1 | E 2 | E 3 | E 4 | E 5 | E 6 |
|---|---|---|---|---|---|---|---|---|---|
| Cost of materials | Cement, 400 CNY/t; Water-quenched blast furnace slag, 200 CNY/t; desulfurization gypsum, 30 CNY/t | 81.23 | 217.69 | 77.08 | 70.92 | 50.77 | 73.85 | 70.92 | 55.08 |
| Cost of washing fly ash (calculated according to water cement ratio of 3) | 280 CNY/t | 0 | 43.08 | 43.08 | 43.08 | 43.08 | 43.08 | 43.08 | 43.08 |
| Electricity fee for grinding (4.2 kW/h) | 0.725 CNY/kW | 0.66 | 0.04 | 0.63 | 0.58 | 0.44 | 0.62 | 0.58 | 0.46 |
| Machine maintenance cost | 10,000/year | 1.35 | 0.08 | 1.29 | 1.19 | 0.89 | 1.27 | 1.19 | 0.93 |
| Sum | / | 83.24 | 260.89 | 122.08 | 115.77 | 95.18 | 118.82 | 115.77 | 99.55 |

| Solid waste cost savings | Unit price (CNY) | Price per ton of cementitious material produced CE 1 | CE 2 | E 1 | E 2 | E 3 | E 4 | E 5 | E 6 |
|---|---|---|---|---|---|---|---|---|---|
| Tax on solid waste storage (People's Republic of China (PRC) Environmental Protection Tax Law) | 25 CNY/t | 12.12 | 1.92 | 11.92 | 11.15 | 9.62 | 12.50 | 11.15 | 8.85 |
| Hazardous waste disposal costs (landfill disposal and cement kiln disposal) | 1000 CNY/t | 153.8 | 153.85 | 153.85 | 153.85 | 153.85 | 153.85 | 153.85 | 153.85 |
| Sum | / | 165.9 | 155.77 | 165.77 | 165.00 | 163.47 | 166.35 | 165.00 | 162.70 |

TABLE 2-continued

| | | | | | | | | |
|---|---|---|---|---|---|---|---|---|
| Economic benefit of product = price − production cost (per t of cementitious material) | 166.76 | −10.89 | 127.92 | 134.23 | 154.82 | 131.18 | 134.23 | 150.45 |
| Cost saving by solid waste (per t of cementitious material) | 165.97 | 155.77 | 165.77 | 165.00 | 163.47 | 166.35 | 165.00 | 162.70 |
| Total economic benefit = product economic benefit + cost saving by solid waste/benefit (per t cementitious material) | 332.73 | 144.88 | 293.69 | 299.253 | 318.29 | 297.53 | 299.23 | 313.15 |

Note:
Ce 1 and Ce 2 in the above table represent Comparative embodiment 1 and Comparative embodiment 2 respectively, while E 1-E 6 represent Embodiments 1-6 respectively.

The total cost-benefit analysis is carried out assuming a unit price of 250 CNY per ton for the low-cost four-element system cementitious material. The results of the compressive strength tests and the total cost-benefit analysis are shown in Table 3.

TABLE 3

Compressive strength of specimens of clear paste cementitious materials

| Specimens | 3 d | 7 d | 28 d | Total economic benefits |
|---|---|---|---|---|
| | /(Magapascal (Mpa) | | | CNY/t |
| Comparative embodiment 1 | 9.81 ± 0.1 | 20.97 ± 0.1 | 30.66 ± 0.1 | 332.73 |
| Comparative embodiment 2 | 24.55 ± 0.1 | 27.00 ± 0.1 | 37.50 ± 0.1 | 187.96 |
| Embodiment 1 | 4.99 ± 0.1 | 25.98 ± 0.1 | 37.42 ± 0.1 | 293.69 |
| Embodiment 2 | 6.51 ± 0.1 | 23.41 ± 0.1 | 34.96 ± 0.1 | 299.23 |
| Embodiment 3 | 5.16 ± 0.1 | 21.14 ± 0.1 | 26.96 ± 0.1 | 318.29 |
| Embodiment 4 | 4.60 ± 0.1 | 22.99 ± 0.1 | 35.44 ± 0.1 | 297.53 |
| Embodiment 5 | 4.62 ± 0.1 | 21.34 ± 0.1 | 31.38 ± 0.1 | 299.23 |
| Embodiment 6 | 2.66 ± 0.1 | 21.99 ± 0.1 | 28.14 ± 0.1 | 313.15 |

Description of results: from the above Table 3, it can be seen that although the total economic benefit of the Comparative embodiment 1 (with no washing treatment of fly ash) is the highest, amounting to 332.73 CNY/t, the 28 d compressive strength is 30.66 Mpa, which is lower than the 28 d compressive strength of the Embodiment 1, Embodiment 2, Embodiment 4 and Embodiment 5 (with washing treatment of waste incineration fly ash W1 and W7) (31.38-37.50 Mpa). Table 4 shows that the Pb ion concentration of Comparative embodiment 2 (with cement) exceeds the drinking water standard at both 3 d and 28 d. In contrast, there is no risk of heavy metal leaching in Comparative embodiment 1 (without washing treatment of fly ash). Embodiments 1, 2, 4 and 5 (including washed waste incineration fly ash W1 and W7) are free of $Cl^-$ and $SO_4^{2-}$ anion leaching risk, with ranges of 95.00-230.34 mg/L and 20.95-70.09 mg/L, respectively, which proves that the washing pretreatment of the fly ash makes the four-element solid waste-based cementitious materials free of anion leaching risk, but the cementitious materials still have anion leaching risk. Moreover, the total economic benefit of the proportion 2 (containing cement) is only 144.88 CNY/t, and the total economic benefit of the cementitious materials in Embodiment 1 to 5 is 293.69-318.29 CNY/t, suggesting a strong economic benefit advantage of the low-cost four-element system cementitious material.

As can be seen from Tables 1 and 3 above, the embodiments of the present disclosure still exhibit high compressive strength after making cementitious materials using fly ash that is so hazardous, indicating that there is a good synergy between the pretreated waste incineration fly ash of the embodiments of the present disclosure and the bottom ash of the waste incineration, the water-quenched blast furnace slag and desulfurization gypsum, and that this synergy improves the compressive strength of the cementitious materials and the synergistic utilization of the pretreated waste incineration fly ash and the bottom ash of the waste incineration, bringing about an extremely high economic benefit.

TABLE 4

Leaching concentrations of heavy metals and anions in fly ash, pretreated waste incineration fly ash and clear paste cementitious material

| | | Heavy metals (μg/L) | | | | | | | | Anions (mg/L) | |
|---|---|---|---|---|---|---|---|---|---|---|---|
| | Sample | Pb | Zn | Cu | As | Cr | Cd | Hg | Sb | $Cl^-$ | $SO_4^{2-}$ |
| | Fly ash | 10827.51 | 11939.22 | 7.49 | 92.38 | 424.89 | 29.85 | 0.58 | 17.15 | 16418.18 | 1507.77 |
| | Pretreated fly ash (W1) | 2539.70 | 3681.21 | / | 49.31 | 170.54 | 6.03 | / | 1.52 | 8369.77 | 991.27 |
| | Pretreated fly ash (W7) | 2357.89 | 4789.71 | / | 32.35 | 106.59 | 4.35 | / | 0.36 | 5590.45 | 1014.21 |
| 3 d | Ce 1 | 2.70 | 6.51 | / | 3.14 | 35.40 | 0.36 | / | 0.83 | 1927 | 1031.2 |
| | Ce 2 | 15.23 | 7.13 | / | 9.61 | 34.27 | 2.36 | 0.01 | 1.19 | 2288.03 | 437.51 |
| | E 1 | 4.10 | 4.13 | / | 1.78 | 41.87 | 0.35 | / | 1.25 | 152 | 55.91 |
| | E 2 | 1.74 | 0.01 | / | 2.13 | 45.02 | 0.21 | / | 0.84 | 230.34 | 70.09 |
| | E 3 | 1.67 | 0.01 | / | 0.95 | 31.70 | 0.10 | / | 0.72 | 551.21 | 80.41 |
| | E 4 | 2.29 | / | / | 1.51 | 43.92 | 0.13 | / | 0.80 | 121 | 30.76 |
| | E 5 | 3.12 | 0.02 | / | / | 47.51 | 0.21 | / | 0.91 | 145.41 | 40.12 |
| | E 6 | 1.51 | 0.01 | / | 0.45 | 29.52 | / | / | 0.59 | 109.39 | 50.31 |
| 7 d | Ce 1 | 1.69 | 5.89 | / | 1.89 | 20.33 | 0.16 | / | 0.96 | 1951 | 1051 |
| | Ce 2 | 9.63 | 8.12 | / | 2.03 | 30.76 | 0.98 | / | 3.50 | 1874.99 | 613.55 |
| | E 1 | 6.93 | 4.31 | / | 1.12 | 23.25 | 0.09 | / | 1.61 | 167.01 | 60.44 |
| | E 2 | 1.31 | 0.01 | / | 1.44 | 28.23 | 0.12 | / | 1.42 | 210.31 | 60.71 |

TABLE 4-continued

Leaching concentrations of heavy metals and anions in fly ash, pretreated waste incineration fly ash and clear paste cementitious material

| | Sample | Heavy metals (μg/L) | | | | | | | | Anions (mg/L) | |
|---|---|---|---|---|---|---|---|---|---|---|---|
| | | Pb | Zn | Cu | As | Cr | Cd | Hg | Sb | $Cl^-$ | $SO_4^{2-}$ |
| | E 3 | 3.53 | 0.01 | / | 1.48 | 29.45 | 0.18 | / | 0.94 | 461.91 | 72.18 |
| | E 4 | 4.19 | / | / | 0.83 | 25.96 | 0.09 | / | 3.08 | 107.25 | 25.22 |
| | E 5 | 1.91 | 0.01 | / | / | 23.98 | 0.12 | / | 2.54 | 154.21 | 35.63 |
| | E 6 | 4.15 | 0.01 | / | 1.05 | 26.91 | 0.15 | / | 1.23 | 113.41 | 45.16 |
| 28 d | Ce 1 | 0.79 | 4.61 | / | 1.16 | 18.28 | 0.11 | / | 0.66 | 1821.32 | 961.87 |
| | Ce 2 | 10.32 | 7.74 | / | 1.01 | 25.41 | 0.64 | / | 1.55 | 2115.73 | 784.88 |
| | E 1 | 1.83 | 0.01 | / | 0.73 | 17.03 | 0.12 | / | 0.82 | 141.04 | 50.25 |
| | E 2 | 2.35 | / | / | 0.98 | 19.68 | 0.25 | / | 0.93 | 197.19 | 66.20 |
| | E 3 | 1.01 | 0.01 | / | / | 17.92 | 0.21 | / | 0.54 | 512.54 | 61.22 |
| | E 4 | 0.89 | / | / | / | 20.11 | 0.03 | / | 1.2 | 95.00 | 20.95 |
| | E 5 | 1.02 | 0.01 | / | / | 27.91 | 0.08 | / | 0.75 | 116.05 | 28.42 |
| | E 6 | 1.53 | 0.01 | / | 0.97 | 21.52 | 0.16 | / | 1.36 | 102 | 34.01 |
| | Drinking water | μg/L | | | | | | | | mg/L | |
| | quality standards | 10 | 1000 | 50 | 10 | 50 | 5 | 1 | 5 | 250 | 250 |

Markers: '/' for 'not detected', below the detection line (0.01 μg/L); a means that all values are detected three times (p=0.001).

The embodiments of the present disclosure achieve synergetic resource utilization of waste incineration bottom ash, and the composition is simplified at the same time; owing to the synergistic effect, a good cementing performance can still be demonstrated, including high compressive strength and effective curing ability for a variety of heavy metals and other harmful substances in the fly ash.

To sum up, the present disclosure of the material synergistically uses water-washed waste incineration fly ash, waste incineration bottom ash, water-quenched blast furnace slag and desulfurization gypsum to prepare low-cost cement-free clinker cementitious materials, and determines the range of particle size distribution of the raw materials, so as to make maximum resourceful utilization of the waste incineration fly ash and the waste incineration bottom ash, and to provide a better admixture of the pre-treated waste incineration fly ash and the waste incineration bottom ash in the cement-free clinker four-element system cementitious system, which brings about a very high economic benefit.

The description above represents preferred embodiments of the present disclosure, and it should be noted that for a person of ordinary skill in the art, a number of improvements and embellishments are also possible without departing from the principles described in the present disclosure, and these improvements and modifications are also to be regarded as the scope of protection of the present disclosure.

What is claimed is:

1. A four-element system cementitious material, comprising following raw materials in percentage by mass according to 100% by mass of the four-element system cementitious material: 20-60% of water-quenched blast furnace slag, 10-40% of waste incineration bottom ash, 20% of waste incineration fly ash pretreated by water washing and a balance of desulfurization gypsum.

2. The four-element system cementitious material according to claim 1, wherein according to a mass percentage, in the waste incineration fly ash pretreated by water washing, a content of CaO is ≥45%, a content of Cl is ≥20%, a content of $Na_2O$ is ≥10%, a content of $SiO_2$ is ≥3%, and a content of $Al_2O_3$ is ≥2%.

3. The four-element system cementitious material according to claim 1, wherein according to a mass percentage, in the waste incineration bottom ash, a content of $SiO_2$ is ≥32%, a content of CaO is ≥30%, a content of $Al_2O_3$ is ≥7%, a content of $Fe_2O_3$ is ≥5%, and a content of $Na_2O$ is ≥2%.

4. The four-element system cementitious material according to claim 1, wherein according to a mass percentage, in the water-quenched blast furnace slag, a content of CaO is ≥35%, a content of $SiO_2$ is ≥28%, a content of $Al_2O_3$ is ≥12%, and a content of MgO is ≥5%.

5. The four-element system cementitious material according to claim 1, wherein according to a mass percentage, in the desulfurization gypsum, a content of CaO is ≥45%, and a content of $SO_3$ is ≥40%.

6. The low cost four-element system cementitious material according to claim 1, wherein a specific surface area of the water-quenched blast furnace slag is 450-500 $m^2$/kg, a specific surface area of the waste incineration fly ash pretreated by water washing is ≥500 $m^2$/kg, a specific surface area of the waste incineration bottom ash is 400-450 $m^2$/kg, and a specific surface area of the desulfurization gypsum is 450-500 $m^2$/kg.

7. A preparation method of the four-element system cementitious material according to claim 1, comprising the following steps:

S1, carrying out water washing pretreatment on waste incineration fly ash to obtain a waste incineration fly ash pretreated by water washing;

S2, uniformly mixing the waste incineration fly ash pretreated by water washing with waste incineration bottom ash, water-quenched blast furnace slag and desulfurization gypsum according to a mass ratio to obtain a four-element system cementitious material; and S3, mixing water with the four-element system cementitious material according to a mass ratio of (1-2):5 to prepare a cementitious material.

* * * * *